March 11, 1969  C. R. WISE  3,432,853
BIDIRECTIONAL FLOW BEACON
Filed Sept. 6, 1967

INVENTOR,
Charles R. Wise

BY: Harry M. Saragovitz,
Edward J. Kelly &
R. P. Gibson  ATTORNEYS.

TWO WAY SIGNAL TRANSMISSION FOR ANTENNA PAIR 13-14

CONTROLLED TWO WAY TRANSMISSION FOR ANTENNA PAIRS 11-12 AND 13-14

INVENTOR,
Charles R. Wise
BY: Harry M. Saragovitz,
Edward J. Kelly &
R. P. Gibson        ATTORNEYS.

3,432,853
BIDIRECTIONAL FLOW BEACON
Charles R. Wise, Las Cruces, N. Mex., assignor to the United States of America as represented by the Secretary of the Army
Filed Sept. 6, 1967, Ser. No. 666,558
U.S. Cl. 343—6.8
Int. Cl. G01s 9/56
2 Claims

ABSTRACT OF THE DISCLOSURE

A bidirectional flow multichannel radar beacon wherein the interrogation signal is received, amplified and then transmitted through diametrically opposed antennas, resulting in a substantial reduction in Doppler frequency error generated due to roll or other change in attitude of the missile carrying beacon with respect to the ground radar.

---

The invention described herein may be manufactured, used, and licensed by or for the Government for governmental purposes without the payment to me of any royalty thereon.

Present day radar beacons are used for extending tracking range and as an aid to Doppler velocity tracking. Three basic types of pulsed radar beacons now in use include the crystal video beacon, the superheterodyne radar beacon, and the pulse coherent radar beacon. The crystal video radar beacon is a range extension aid which has a limited sensitivity and a peak power output of 100 watts or less. The superheterodyne beacon radar is designed for greater range extension, has more sensitivity and higher peak power output than the crystal video beacon. The pulse coherent radar beacon is designed for use as a range extension and a Doppler velocity tracking aid and has approximately the same sensitivity and peak power output characteristics of the superheterodyne beacons and is of the type utilized in an embodiment of the invention.

Radar beacons when installed in a missile are connected to an antenna system consisting of two to four antennas which are mounted on the surface of the missile. Each of these antennas receives the coded radar signals which may be, for example, generated by the ground radar or interrogator. The antennas are coupled to a distribution block or power divider connected to the beacon receiver whereby the signals are applied to the receiver. The signals after having been processed by the beacon receiver activate the beacon transmitter or for the transmitter of a pulse coherent beacon, it is power amplified to provide return signals. The transmitter is coupled to the antenna distribution block whereby the signals are redistributed to the antenna system and retransmitted to the receiver of the ground radar. As the missile changes attitude during flight, the signals received and transmitted by the radar beacon are degraded in regard to phase and amplitude. For the changing attitude of the missile each of the antennas mounted on the missile receives the signal generated by the ground radar with varying phases and amplitudes. The signals thus received are summed within the beacon receiver and during certain missile attitudes add to zero within the beacon receiver to produce signal nulls in the output thereof. Therefore, as the missile or vehicle rolls or changes attitude, the signal level into the beacon receiver video network varies between peaks and nulls causing a variation in time at which the transmitter fires. This time interval variation is known as beacon delay variation, and a variation is this time results in a range variation measurement at the ground radar. Because of this phenomenon the range to the beacon is difficult if not impossible to accurately measure. When the pulse coherent beacon is used, the signal peaks and nulls cause delay variation and the variation in received and transmitted signal phase also cause Doppler velocity error. For example, when this type of beacon is installed in a cylindrical vehicle or missile of 25 cm. radius and a roll rate of one revolution per second is encountered, the peak Doppler frequency error contribution (at C–BAND) of only one antenna is approximately 60 Hz. 60 Hz. represents about 6 feet of Doppler velocity error which is thirty-six times greater than the normal design goal of 0.15 foot per second error contribution by the beacon.

An object of the invention is a bi-directional flow radar beacon wherein the radar signals are received, amplified and transmitted through diametrically opposed antennas.

Another object of the invention is a new and novel radar beacon for achieving more accurate range and Doppler velocity data when tracking airborne vehicles.

Another object of the invention is a bi-directional flow radar beacon having radiation means consisting of diametrically opposed antennas and wherein each said pair of said antennas is provided with two radar beacon channels.

Another object of the invention is a bi-directional flow radar beacon wherein the Doppler frequency deviation generated due to roll and attitude of the missile or vehicle carrying the beacon is substantially eliminated.

The invention will be more fully understood and its objects and advantages further appreciated by referring now to the following detailed specification taken in conjunction with the accompanying drawings in which.

Figure 1:
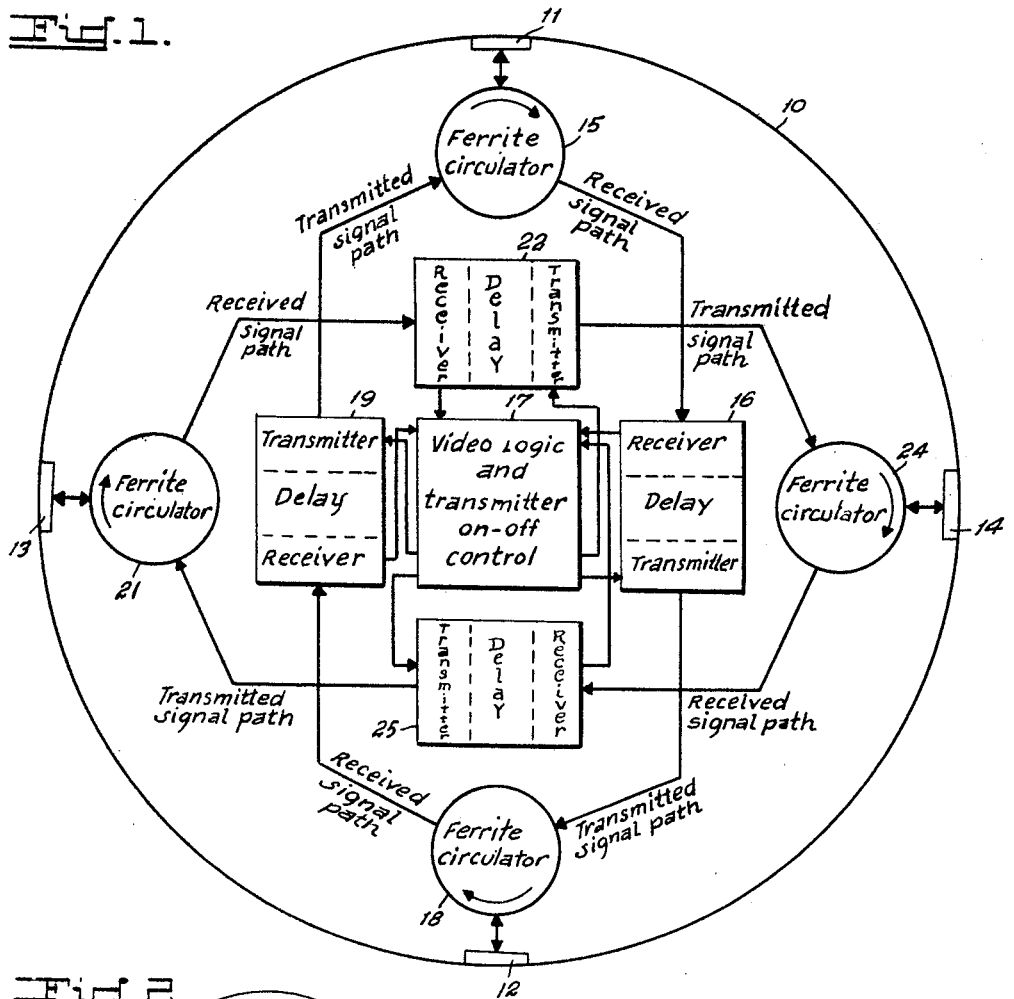
FIGURE 1 is a functional block diagram illustrating the bidirectional flow radar beacon of the invention.

Referring now to FIGURE 1, reference numberal 10 indicates the cylindrical body of a missile or other airborne vehicle having mounted on or in the surface thereof a first pair of diametrically opposed annular slot antennas 11 and 12 and a second pair of diametrically opposed annular slot antennas 13 and 14. The two pairs of antennas are positioned at right angles to each other in a plane normal to horizontal axis of the vehicle body. A ferrite circulator 15 couples the radar interrogation signal received by antenna 11 to the input of the receiver of the receiver-transmitter channel 16. The output of the receiver of channel 16 is applied through delay means such as quartz crystal means to pulse the transmitter of channel 16 and also to the input of the video logic of the video logic and transmitter on-off control 17. The delay means keeps the signal at the output of the receiver from pulsing the transmitter for a length of time sufficient to enable control 17 to function and activate the transmitter of channel 16. The output of channel 16 transmitter is coupled to antenna 12 by means of ferrite circulator 18. Ferrite circulator 18 also couples the radar interrogation signal received by antenna 12 to the input of the receiver of receiver-transmitter channel 19 which is identical as to elements and functions as channel 16 and also has its receiver and transmitter elements coupled to the video logic and transmitter on-off control 17 in the same manner as channel 16. The output of the transmitter of channel 19 is coupled to the antenna 11 through means of the ferrite circulator 15. The radar signal received by annular slot antenna 13 is coupled by means of ferrite circulator 21 to the input of the receiver of the channel 22 which consists of identical elements as contained in channel 16, performs the same functions and is coupled to the video logic and transmitter on-off control 17 identically as channel 16. The output of the transmitter of the receiver-transmitter channel 22 is coupled to annular slot antenna 14 by means of ferrite circulator 24 which also couples the radar interrogation signal received by antenna 14 to the receiver input of receiver-transmitter channel 25. The output of the transmitter of receiver-transmitter 25 is coupled to antenna 13 by means of ferrite circulator 21. Channel 25 elements are also identical to and have the same functions as described in conjunction with channel 16 and it is also connected to the video logic and transmitter on-off control 17 in the same manner and for the same function as channel 16. Channels 16, 19, 22 and 25 have an output signal which is frequency coherent with their received input signal. Under static conditions, the signals coupled from the transmitters to the antennas by means of the ferrite circulators are made phase coherent with respect to each other by adjusting the interconnecting RF cable lengths. As described in the foregoing, the output of each of the channel receivers is connected to delay means and also to the video logic of the video logic and transmitter on-off control 17 which functions to decode the radar interrogation signal of ground radar 26, make a comparison of the relative received signal strengths of the four channel units, select the paired channels to be used in view of the received signal strength for transmitting the return signal to the ground radar receiver and activate the transmitters of the selected paired channels for transmitting the return signal to the ground radar receiver.

Figure 2:
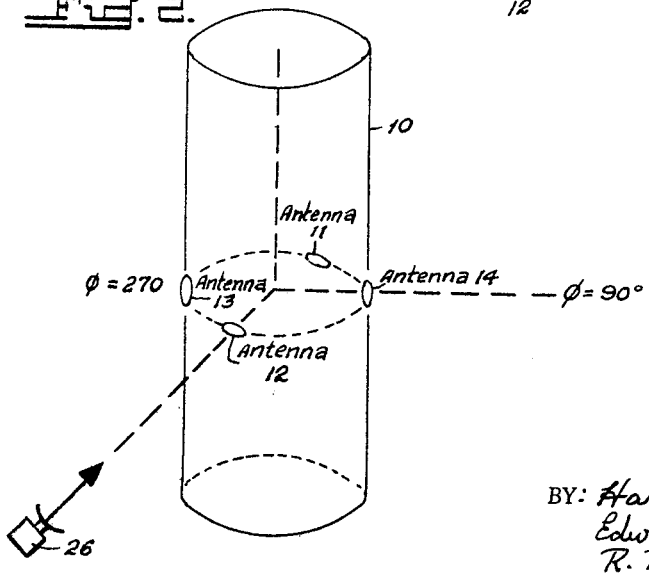
FIGURE 2 is a diagrammatic illustration showing the position of the antennas relative to the ground radar in regard to the graphs of FIGURES 3 and 4.
Figure 3:
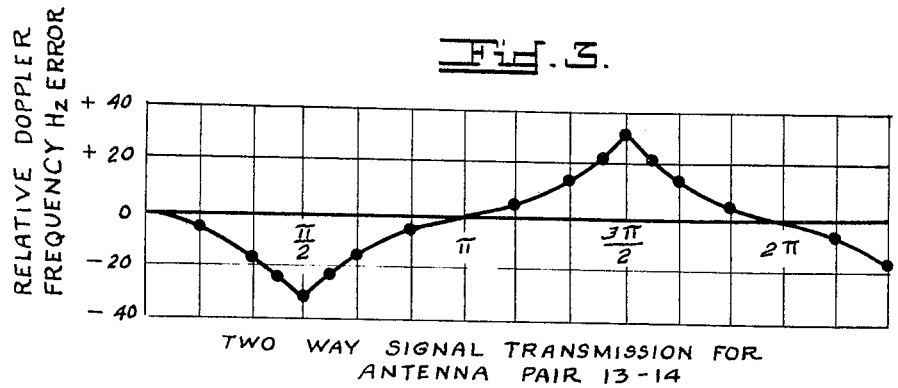
FIGURE 3 is a graph illustrating the Doppler frequency error for two way signal transmission utilizing one pair of diametrically opposed antennas.
Figure 4:
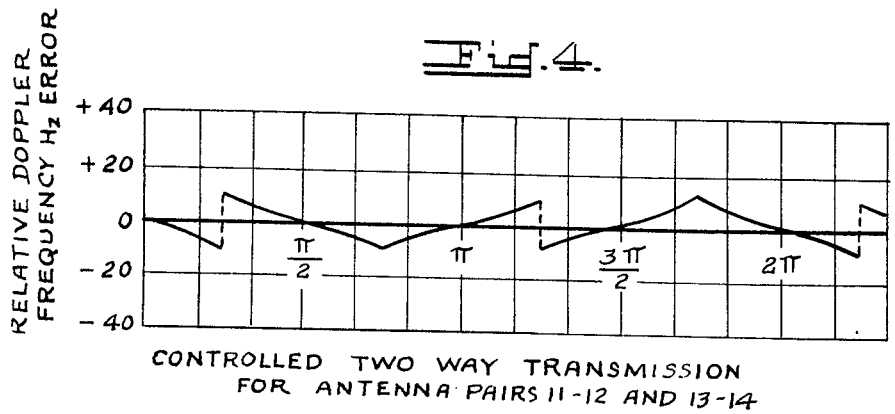
FIGURE 4 is a graph illustrating the reduction in Doppler frequency error for controlled two way transmission utilizing a preferred arrangement of diametrically opposed antennas.

Again with reference to FIGURE 1, the signal flow paths are shown from antenna to antenna. The antennas receive the radar interrogation signal which is coupled to their respective ferrite circulators which in turn direct the received signal to the respective receiver-transmitter channels. Each of the receiver-transmitter channels separately receive, amplify, delay and subsequently transmit the received signal to the appropriate ferrite circulator when the proper command is received from the video logic and transmitter on-off control 17. The related ferrite circulator directs this signal to the antenna that is positioned diametrically opposite the receiving antenna. The antenna thus excited radiates the signal to the ground radar. Now with reference to FIGURE 2, assume a clockwise rotation rate for the missile body 10 such that the motion would generate a Doppler frequency $f_d$ and wherein antenna 14 is at an angle $\phi$ equal to 90° and antenna 13 is at an angle $\phi$ equal to 270° with respect to the ground radar 26 location. The ground radar 26 is located at some distance in the direction where angle $\phi$ equals 0°. Considering the assumed clockwise rotation of the missile, the received signal $f_o$ from antenna 14 contains a Doppler frequency component of plus $f_d$ which is added since the antenna is traveling towards the radar 26. This signal $f_o + f_d$ is then amplified by receiver-transmitter channel 25 and radiated by antenna 13. Antenna 13 is traveling away from radar 26 at the same rate as antenna 14 is traveling towards radar 26, therefore, $f_d$ is subtracted from transmitter-receiver channel 22 signal yielding $f_o + f_d - (f_d)$. This frequency is equal to $f_o$ or the same signal transmitted from radar 26. This means that the Doppler frequency due to rotation of the missile is effectively cancelled for antenna positions at $\phi$ equal to 90° and $\phi$ equal to 270°. The amount of Doppler frequency variation at intermediate angles is shown in the graph of FIGURE 3. The reverse situation exists for the companion receiver-transmitter channel 22 which is also coupled between antennas 13 and 14. The Doppler frequency component $f_d$ is subtracted from the received signal $f_o$ at antenna 13 due to the assumed clockwise rotation of the missile body 10 which causes antenna 13 to travel away from the radar 26. This signal $f_o - f_d$ is then received, amplified and transmitted by means of receiver-transmitter channel 22 to antennas 14. Since antenna 14 is traveling towards radar 26, a plus $f_d$ is added to the transmitted signal. This yields $f_o - f_d + (f_d)$ which again cancels the Doppler frequency component at the antenna positions. Since the electrical distance through each of the channels from antenna to antenna is equal, the transmitted signals are in phase and add, yielding an overall gain for the antenna system. The transmitter-receiver channels 19 and 16 in conjunction with their respective diametrically opposed antennas 12 and 11 function precisely the same as described above with reference to channels 22 and 25. In actual application the video logic and transmitter on-off control 17 allows the transmitters of the channels to transmit only while their respective antennas rotate between $\phi$ equal to 45° and 135° and $\phi$ equals 225° and 315° with respect to radar 26 location.

Figure 5:
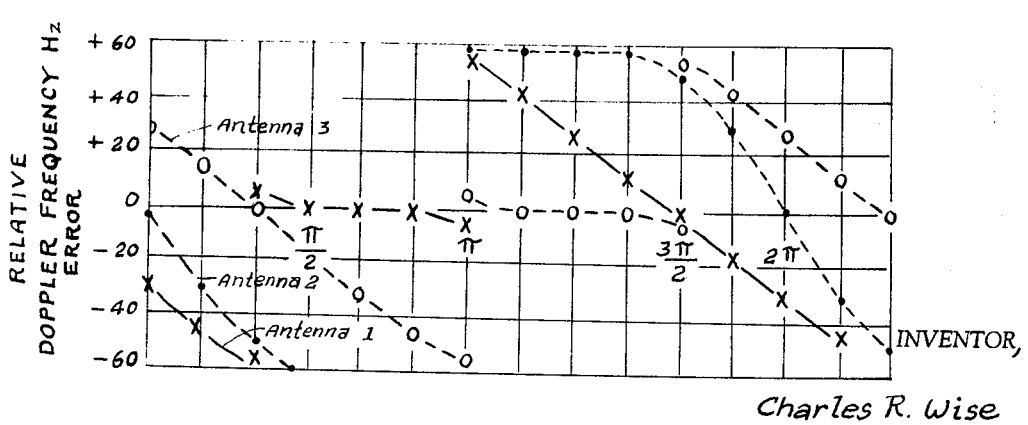
FIGURE 5 is a gaph illustrating the transmitted signal Doppler error from each annular single slot antenna of a three antenna system.

The graph of FIGURE 5 is shown for the purpose of comparison with the results obtained with the bi-directional flow beacon of the invention and illustrates the magnitude of the two-way Doppler frequency error of each antenna of a three antenna system. The antennas 1, 2 and 3 of the aforementioned system are affixed to the peripheral surface of the missile and spaced 120° apart.

Although a specific embodiment of the invention has been illustrated and described, it will be understood that this is but illustrative and that various modifications may be made therein without departing from the spirit of the invention and the scope of the appended claims.

What is claimed is:

1. A bidirectional flow radar beacon for substantially eliminating the Doppler frequency error generated due to roll or change in attitude of a missile carrying said radar beacon in respect to the position of the radar interrogator comprising in combination, an airborne vehicle, a first antenna, a second antenna, said first and second antennas mounted in the peripheral surface of said airborne vehicle and positioned therein diametrically opposite to each other, a first signal processing channel means having an input coupled to said first antenna through a first ferrite circulator and an output coupled to said second antenna through a second ferrite circulator whereby the interrogation signal received by said first antenna is radiated by said second antenna, a second signal processing channel means having an input coupled to said second antenna through said second ferrite circulator and an output coupled to said first antenna through said first ferrite circulator whereby said interrogation signal received by said second antenna is radiated by said first antenna.

2. A bidirectional flow radar beacon for substantially eliminating the Doppler frequency error generated due to the roll or change in attitude of a missile carrying said beacon relative to the location of the radar interrogator comprising in combination, an airborne vehicle, a first pair of antennas comprising first and second annular slot antennas positioned diametrically opposite each other on the peripheral surface of said airborne vehicle, a second pair of antennas comprising third and fourth annular slot antennas positioned diametrically opposite each other on the peripheral surface of said airborne vehicle, said first and second pairs of antennas positioned at right angles to each other in a plane transverse of the longitudinal axis of said airborne vehicle, a first paired radar beacon channel comprising a first and a second radar beacon channel, a second paired radar beacon channel comprising a third and fourth radar beacon channel, said first radar beacon channel having an input means coupled to said first antenna through a first ferrite circulator and an output means coupled to said second antenna through a second ferrite circulator, said second radar beacon channel having an output means coupled to said first antenna through said first ferrite circulator and input means coupled through said second ferrite circulator to said second antenna, said third radar beacon channel having an input means coupled through a third ferrite circulator to said third antenna and an output means coupled through a fourth circulator to said fourth antenna, said fourth radar beacon channel having an output means coupled through said third ferrite circulator to said third antenna and an input means coupled through said fourth ferrite circulator to said fourth antenna, said input means of each of said channels consisting of a receiver coupled to said output means of each said channel consisting of a transmitter by signal delay means whereby the interrogation signal received by said receiver is delayed before being applied to said transmitter, and control means comprising video logic means operatively coupled to transmitter on-off control means, the output interrogation signal of each receiver of each said paired channels being coupled to said video logic means and the transmitters of each said paired channels being coupled to said transmitter on-off control means, said video logic means decoding the received interrogation signal and selecting the paired channels of greater signal strength to function said transmitter on-off control means whereby the transmitters of the selected paired channel are activated to transmit said interrogation signal through the related diametrically opposed annular slot antennas, the interrogation signal received by one of said related diametrically opposed annular slot antennas being radiated by the other of said related diametrically opposed annular slot antennas and said interrogation signal received by said other of said related diametrically opposed annular slot antennas being radiated by said one of said related diametrically opposed antennas.

References Cited

UNITED STATES PATENTS

| | | |
|---|---|---|
| 3,095,538 | 6/1963 | Silberstein. |
| 3,196,438 | 7/1965 | Kompfner. |
| 3,290,677 | 12/1966 | Jacob _____ 343—6.8 X |

RODNEY D. BENNETT, *Primary Examiner.*

M. F. HUBLER, *Assistant Examiner.*

U.S. Cl. X.R.

343—100